May 8, 1956  E. E. CUCKSON ET AL  2,744,561
MACHINE FOR USE IN THE MANUFACTURE OF ZIP FASTENERS
Filed Nov. 25, 1949  12 Sheets-Sheet 4

FIG. 6.

Inventors
Eric Engel CUCKSON and
Arthur Llewellyn JONES
By 
Attorney

May 8, 1956   E. E. CUCKSON ET AL   2,744,561
MACHINE FOR USE IN THE MANUFACTURE OF ZIP FASTENERS
Filed Nov. 25, 1949   12 Sheets-Sheet 5

Inventors
Eric Engel CUCKSON and
Arthur Llewellyn JONES
By
Attorney

May 8, 1956   E. E. CUCKSON ET AL   2,744,561
MACHINE FOR USE IN THE MANUFACTURE OF ZIP FASTENERS
Filed Nov. 25, 1949   12 Sheets-Sheet 7

Inventors
Eric Engel CUCKSON and
Arthur Llewellyn JONES
By
Attorney

May 8, 1956  E. E. CUCKSON ET AL  2,744,561
MACHINE FOR USE IN THE MANUFACTURE OF ZIP FASTENERS
Filed Nov. 25, 1949  12 Sheets-Sheet 9

FIG.12.

Inventors
Eric Engel CUCKSON and
Arthur Llewellyn JONES
By
Attorney May 8, 1956  E. E. CUCKSON ET AL  2,744,561
MACHINE FOR USE IN THE MANUFACTURE OF ZIP FASTENERS
Filed Nov. 25, 1949  12 Sheets-Sheet 10

Inventors
Eric Engel CUCKSON &
Arthur Llewellyn JONES
By
Attorney

May 8, 1956     E. E. CUCKSON ET AL     2,744,561
MACHINE FOR USE IN THE MANUFACTURE OF ZIP FASTENERS
Filed Nov. 25, 1949     12 Sheets-Sheet 12

United States Patent Office 2,744,561
Patented May 8, 1956

2,744,561

MACHINE FOR USE IN THE MANUFACTURE OF ZIP FASTENERS

Eric Engel Cuckson, Cardiff, Wales, and Arthur L. Jones, St. Mary, New South Wales, Australia, assignors to W. E. Cuckson & Son Limited, Sheffield, England, a British company Application November 25, 1949, Serial No. 129,296

2 Claims. (Cl. 153—1)

The present invention relates to a machine for use in the manufacture of zip fasteners.

It is an object of the invention to provide a machine for attaching zip fastener interlocking members to a tape to form zip fastener stringers, which machine is simple in its construction, works reliably and at a high speed, is easy to assemble, and easy to dismantle if repairs or adjustments are required.

Other objects and advantages of the invention will become apparent to those skilled in the art from the following detailed description of the invention when read in conjunction with the accompanying drawings, in which.

Figure 1:
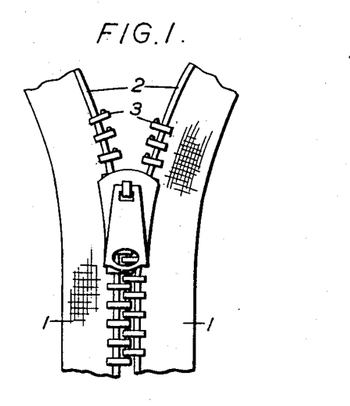
Fig. 1 shows a portion of a conventional zip fastener.

Referring now to the drawings, Fig. 1 shows a portion of a conventional zip fastener comprising two flexible tapes 1, each having a beaded edge 2 on to which fastener interlocking elements 3 are attached. The zip fastener may be opened and closed in known manner by a slider the movement of the slider being limited by stop members (not shown) in the usual manner.

Figure 2:
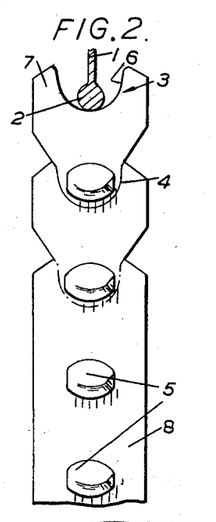
Fig. 2 shows a zip fastener interlocking member just severed from a strip of material and ready for attachment to a tape.

It is known to shape zip fastener interlocking members 3 (see Fig. 2) in such a way that the contour of a head portion 4 (that is the portion which carries a coupling projection 5 at one side and a corresponding coupling recess (not visible in Fig. 2) at the other side) of a member corresponds to the inner contour 6 of the spread legs 7 of the member, whereby the head portion 4 of one member 3 may be nested between the spread legs 7 of another member 3 as illustrated in Fig. 2. In a known process of making such members and attaching them to a tape 1, a flat strip 8 of blank material, usually metal, comprises preformed projections 5 at one side thereof and corresponding recesses at the other side, the projections 5 and recesses constituting the coupling projections and coupling recesses of the members when made. The strip 8 is fed in a step-by-step manner to a working position at which the fastener members 3 are successively severed by means of a punch from the leading end of the strip 8 while the strip is at rest, the legs 7 of the members being directed away from the remainder of the strip 8 whereby severing of a member 3 from the strip 8 causes the end of the strip 8 to be provided with a space corresponding to the space between the legs 7 of the next succeeding member to be severed from the strip 8. A tape 1 having a beaded edge 2 is fed in a step-by-step manner and in timed relationship to the feed of the strip 8 to the said working position in a direction substantially perpendicular to the plane of the strip 8 so that the beaded edge 2 traverses the said space in the leading end of the strip 8; before, or after, or simultaneously with, the severing of a member 3 from the strip 8, its legs 7 are clamped on to the beaded edge 2 of the tape 1 while the tape is at rest by means of a clamping tool, so that after the member 3 has been severed from the strip 8, it is carried away from said working position by the tape 1 when stepping forward.

The present invention relates more particularly to a machine for performing the known method just described.

Figure 3:
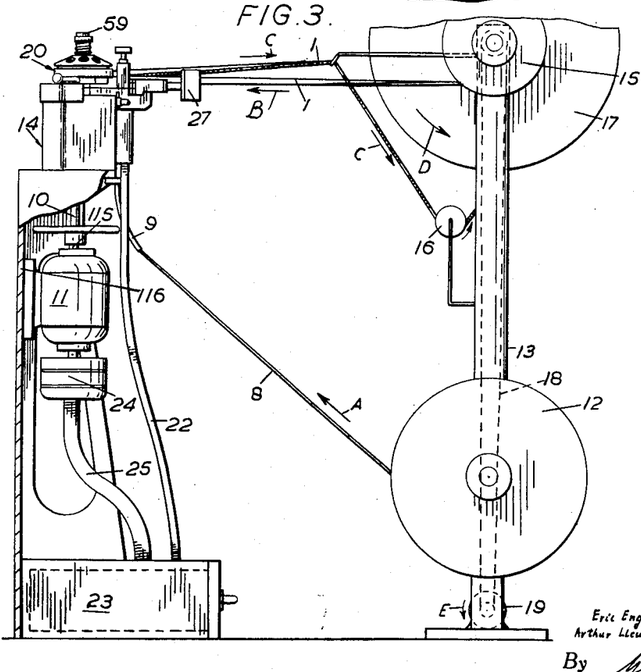
Fig. 3 is a general view of a machine of the invention, some parts being broken away.

The machine generally shown in Fig. 3 for severing members from a metal strip and attaching them to a tape comprises a single driving shaft 10 driven by an electric motor 11, the said driving shaft operating all the cams or eccentrics required for performing the feed of the metal strip 8 in the direction of the arrow A from a storage spool 12 idling in a frame 13 through a feed tube 9 into the attaching machine generally indicated by reference numeral 14, for performing the feed of the tape 1 in the direction of the arrow B from a storage coil 15 idling in the frame 13 to the machine 14, for operating a punch and a clamping tool as will hereinafter be described in detail, and for causing the tape 1 carrying zip fastener interlocking members to leave the machine 14 in the direction of the arrow C. After leaving the machine 14, the tape 1 passes over an idling roller 16 and is collected on a roller 17 mounted on the frame 13 so as to be rotatable in the direction of the arrow D. The roller 17 is suitably driven over pulleys and a belt 18 by any conventional drive 19 rotating in the direction of the arrow E. The tape 1 is intermittently drawn through the machine 14 by means of a tape drum generally denoted by reference numeral 20, the tape drum 20 being rotated in a step-by-step manner around an axis parallel to the driving shaft 10, the said axis and driving shaft being vertically arranged in the embodiment shown. Any waste from the strip 8 falls down through a waste tube 22 (and another similar waste tube which is not visible in Fig. 3) into a waste collecting box 23; an exhaust pump 24 driven by the motor 11 and connected to the box 23 by a hose 25 creates a vacuum in the box 23 and the waste tubes 22 whereby the waste is sucked off from the machine and removed.

Referring now more specifically to Figs. 4 to 15 of the drawings, the tape 1, before entering the machine, passes through a tape channel 26 of a feeler device 27 (see Figs. 3 and 5), one wall of the tape channel 26 being formed by a feeler block 28 slightly urged by a spring 29 against the tape when passing through the tape channel 26. The feeler block 28 acts over a connecting link 30 on an electric switch indicated at 31 of any suitable and known construction. In use, the feeler block 28 bears without updue friction against the tape and moves up or down when the thickness of the tape increases or decreases. When the variation in the thickness of the tape exceeds a permissible amount, the corresponding up or down movement of the feeler block 28 correspondingly exceeds a predetermined value and causes the electric switch 31 to interrupt the electric current to the electric motor 11 and thus to stop the machine.

From the tape channel 26 in the feeler device 27, the tape is fed through a main tape guide 38 in a direction substantially perpendicular to the driving shaft 10 (in the drawings horizontally) to a working position where it meets the metal strip 8 fed to the said position in a direction substantially parallel to the driving shaft 10 (in the drawings vertically). At the said position there are arranged: a punch 32 for severing one member 3 at a time from the metal strip 8 and thereby forming the inner contour of the spread legs of the next succeeding member, their outer contour being formed by the punch by severing small pieces of waste from the strip 8; a die 33 and an auxiliary die 333 co-operating with the punch 32; a pair of clamping means (hereinafter called "hammers") 34 for clamping the leading member around the beaded edge 2 of the tape 1; an ejector 35 for ejecting the severed member from the die 33; a punch presser 36 for permanently urging the punch 32 towards an eccentric controlling the movements of the punch; and a feed finger 37 for feeding the strip 8 intermittently to the working position.

Figure 11:
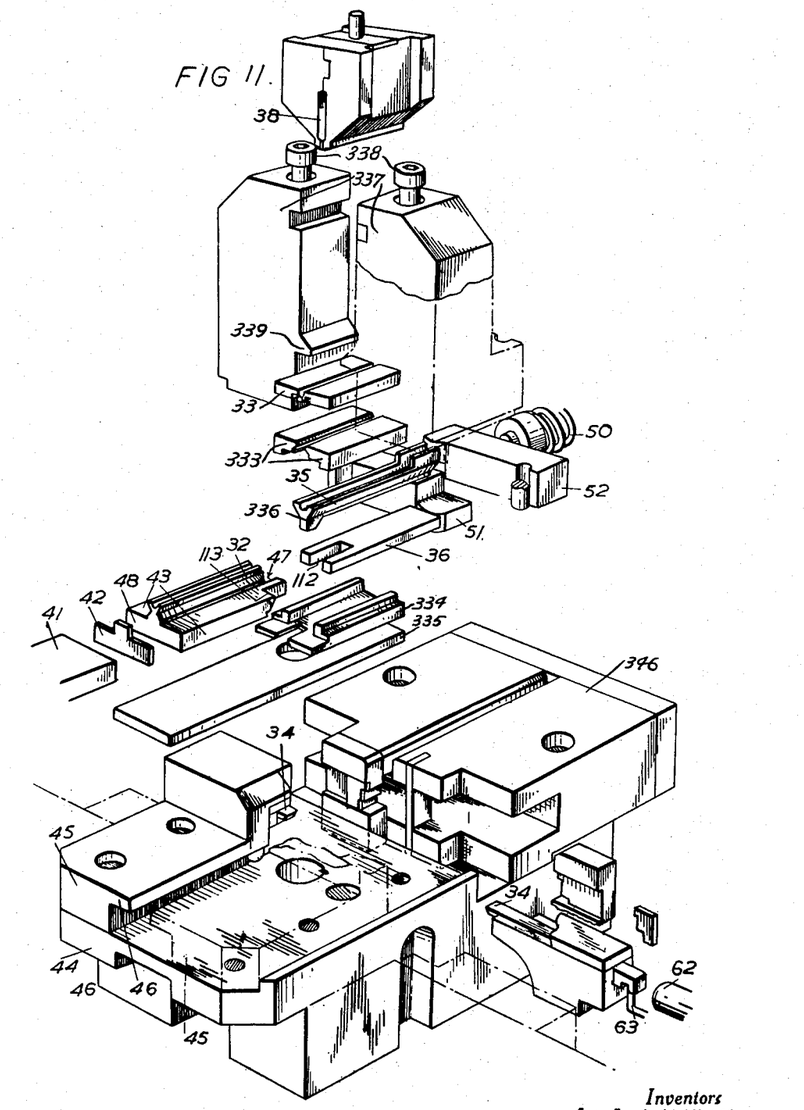
Fig. 11 is an exploded perspective view of the punching and attaching mechanism of the machine.
Figure 12:
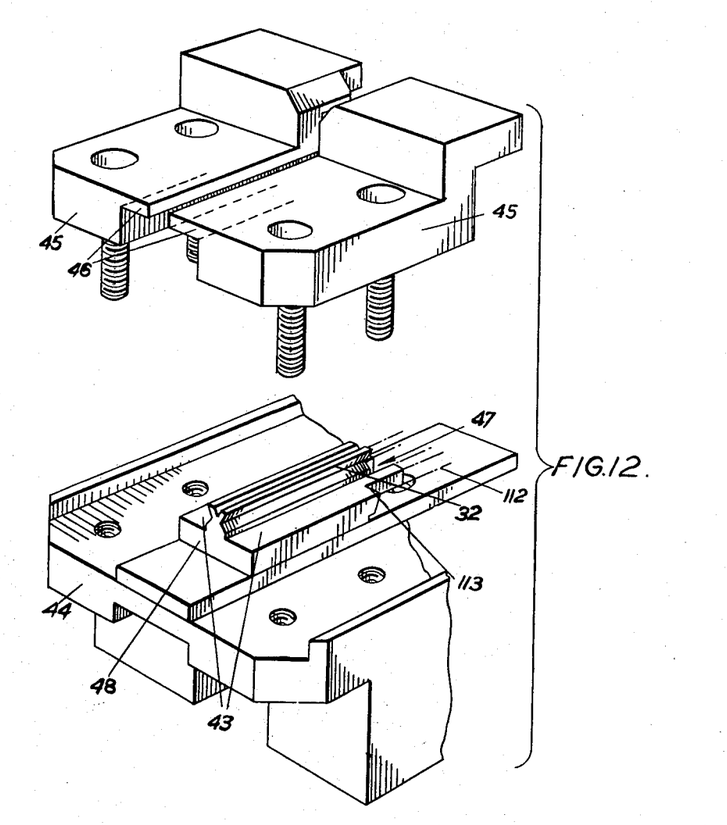
Fig. 12 is a further exploded view intended to illustrate the attachment of the reciprocatable punch.
Figure 13:
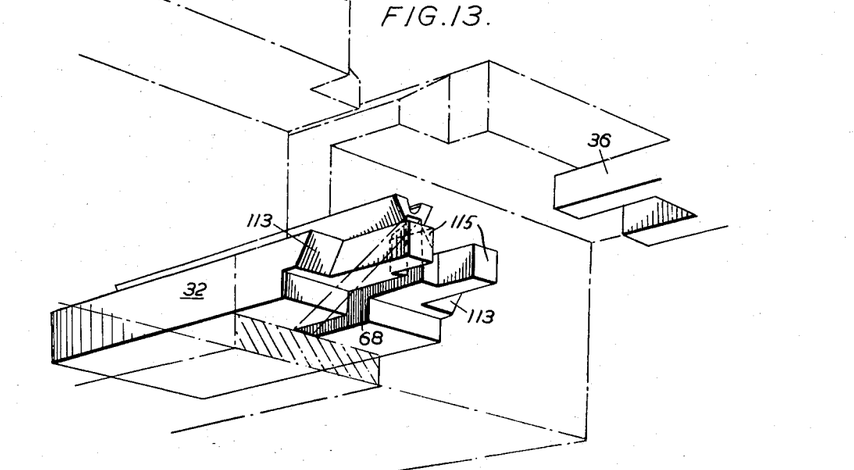
Fig. 13 is a perspective view of the punch when viewed from underneath.
Figure 14:
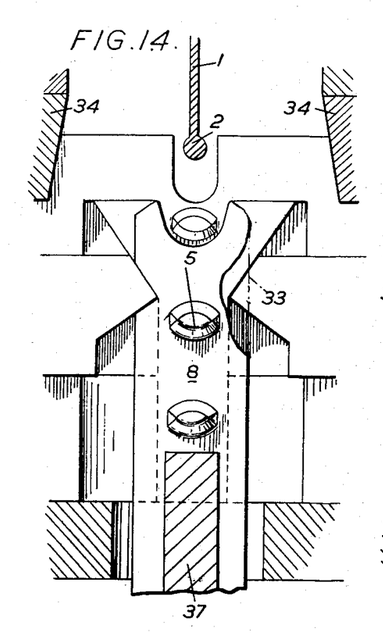
Figs. 14 and 15 are intended to illustrate the operating of the punch and die, and of hammers for clamping interlocking members on to a tape.

The punch 32, the shape of which can perhaps best be seen from Figs. 11, 12 and 13, is so shaped that in cooperation with the die 33 and the auxiliary die 333 it is capable of severing, in one stroke, the leading interlocking member from the metal strip 8 and removing some pieces of waste 39 (see Fig. 15) from the edges of the metal strip 8 to form the outer contour of the legs of the next succeeding interlocking member, the pieces 39 being sucked away to fall down through the waste tubes 22 into the waste collecting box 23 (see Fig. 3).

The punch 32 comprises a short length of a hardened metal bar (see Figs. 11 and 12) having two lateral guide shoulders 43, one at each side, which extend in the longitudinal direction of the bar so that the bar has a somewhat T-shaped cross-section perpendicular to its longitudinal direction. The front 47 of the metal bar is so shaped as to be capable of acting as the blanking means of the punch. The punch 32 is slidably located in guiding means comprising a support 44 to which two parts 45 are screwed, one at each side of the punch 32, each part having a flange 46 overlapping a shoulder 43 of the punch 32, the arrangement being such that the punch can reciprocate in its longitudinal direction and is guided by means of its shoulders 43 sliding in guide channels formed between the support 44 and the said flanges 46. Facing the blanking means of the punch, the die 33 is provided for co-operation with the punch. Reciprocating means for the punch are arranged at the rear 48 of the punch. The said reciprocating means comprise an eccentric 40 (see particularly Fig. 5) having a ball bearing the inner race of which is eccentrically seated on the driving shaft 10 so as to rotate therewith, while the outer race bears against a distance piece 41. The distance piece 41 engages an exchangeable piece of padding 42 (see also Fig. 11) which in turn engages the rear 48 of the punch 32. By using a ball bearing as eccentric 40, friction is reduced, while the piece of padding 42 which can be exchanged against similar pieces of slightly different thicknesses serves to compensate slight changes in the length of the punch which may occur when the blanking means of the punch are re-sharpened from time to time.

The punch presser 36 is normally pressed against the front 47 of the punch under the action of a spring 49 (see Fig. 5), which spring 49 bears against a lever arm 51 (see also Fig. 11) pivoted at 53 and pressing against the punch presser 36 so that the punch 32 is permanently urged towards the eccentric 40. It will easily be understood that on rotation of the driving shaft 10 the punch 32 is reciprocated in a direction substantially perpendicular (in the drawings horizontally) to the driving shaft 10 by the eccentric 40.

The ejector 35 is permanently pressed towards the punch 32 against the metal strip 8 under the action of a second spring 50 (see Figs. 5 and 11) by means of an intercalated second lever arm 52 pivoted at 54. The ends of the lever arms 51, 52 are provided with slightly convex portions 55 for contacting the punch presser 36 and the ejector 35 respectively. As can best be seen from Fig. 11, the lever arms 51 and 52 are stepped at their free ends so that the lever arms lie at the same level with their free ends overlying each other so as to operate the ejector 35 and the punch presser 36, the ejector 35 lying on top of the punch presser 36 (see also Fig. 7).

Figure 15:
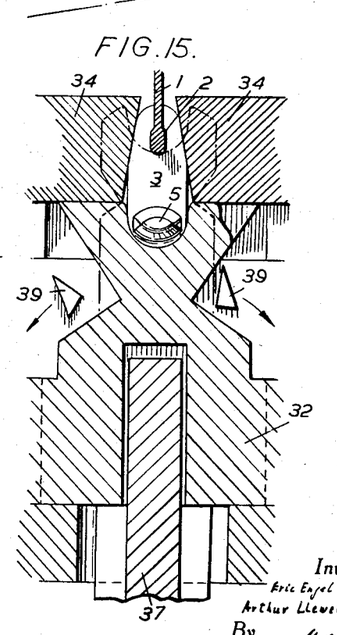
Figure 16:
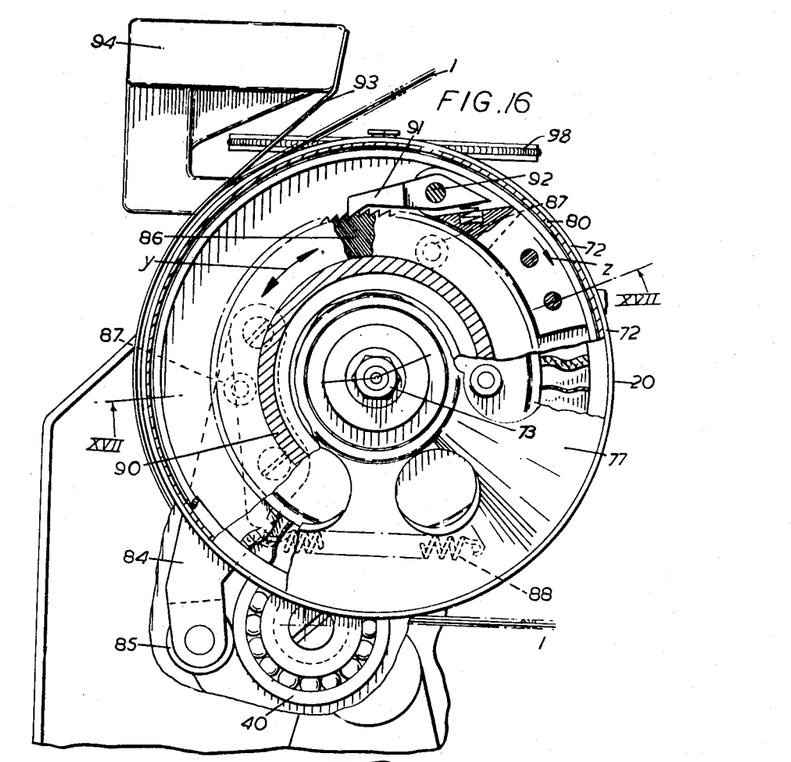
Fig. 16 is a plan view of the tape drum of the machine, some parts being broken away and others shown in section.

The ejector 35 is slidable within the auxiliary die 333 (Figs. 6, 8 and 11) which is formed in two parts and has its die surface shaped to co-operate with the punch 32 for shearing the waste pieces 39 (see Fig. 15). As can be seen most clearly from Figs. 6, 7, 9 and 11, the die 33 and the auxiliary die 333 form an assembly with the ejector 35, the punch presser 36, a punch presser slide 334, a support plate 335 and an auxiliary support 346, the arrangement being as follows: the die 33 overlies the auxiliary die 333, the ejector is slidable within the auxiliary die 333 between the two parts thereof, its nose 336 lying in a fork 112 provided on the punch presser 36, the punch presser being arranged, together with the ejector 35, between the auxiliary die 333 and the punch presser slide 334. The punch presser slide 334 is separated by a support plate from the auxiliary support 346 which is mounted on support 44. The above mentioned assembly is held on the auxiliary support 346 by two mounting blocks 337 which are screwed to the auxiliary support 346 by screws 338. Each mounting block 337 has a flange 339 which serves for contacting the said assembly.

The hammers 34 are reciprocated in a direction substantially perpendicular to the driving shaft 10 (in the drawings horizontally) and perpendicular to the direction of the reciprocating movements of the punch 32, the ejector 35 and the punch presser 36. The hammers 34 are actuated by a second eccentric 56 (see Figs. 4, 5 and 7) bearing against studs 57 on two lever arms 58 (see also Fig. 6), one on each, the lever arm 58 at the rear of the machine being pivoted on an auxiliary shaft 59 and the other lever arm 58 on a shaft 591, the two lever arms 58 overlapping each other with their adjacent ends, which are stepped for this purpose. A spring 60 attached to both arms by studs 61 urges the overlapping ends together whereby the studs 57 are kept in operative engagement with the second eccentric 56. The other ends of the lever arms 58 carry set screws 62 (see also Fig. 11) bearing against the ends of the hammers 34 which are held in engagement with the set screws 62 by spring means 63. The set screws 62 allow the amplitude of the reciprocations of the hammers 34 to be adjusted.

Figure 4:
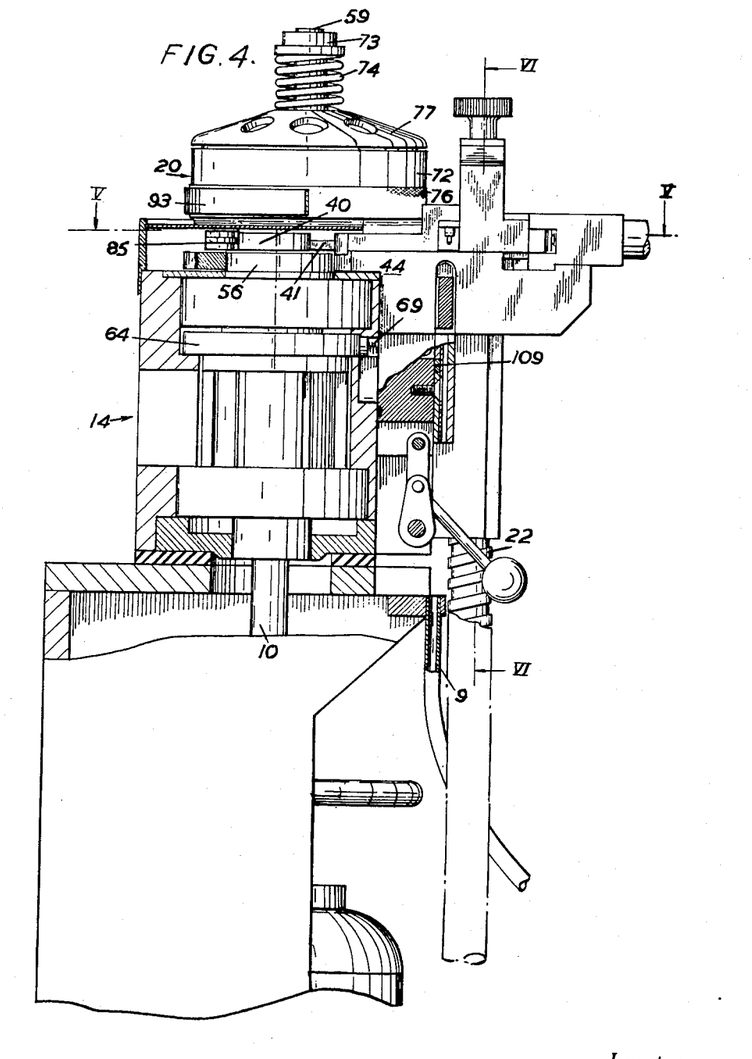
Fig. 4 shows a portion of the machine of Fig. 3, on an enlarged scale, partly in section, some parts being broken away.
Figure 5:
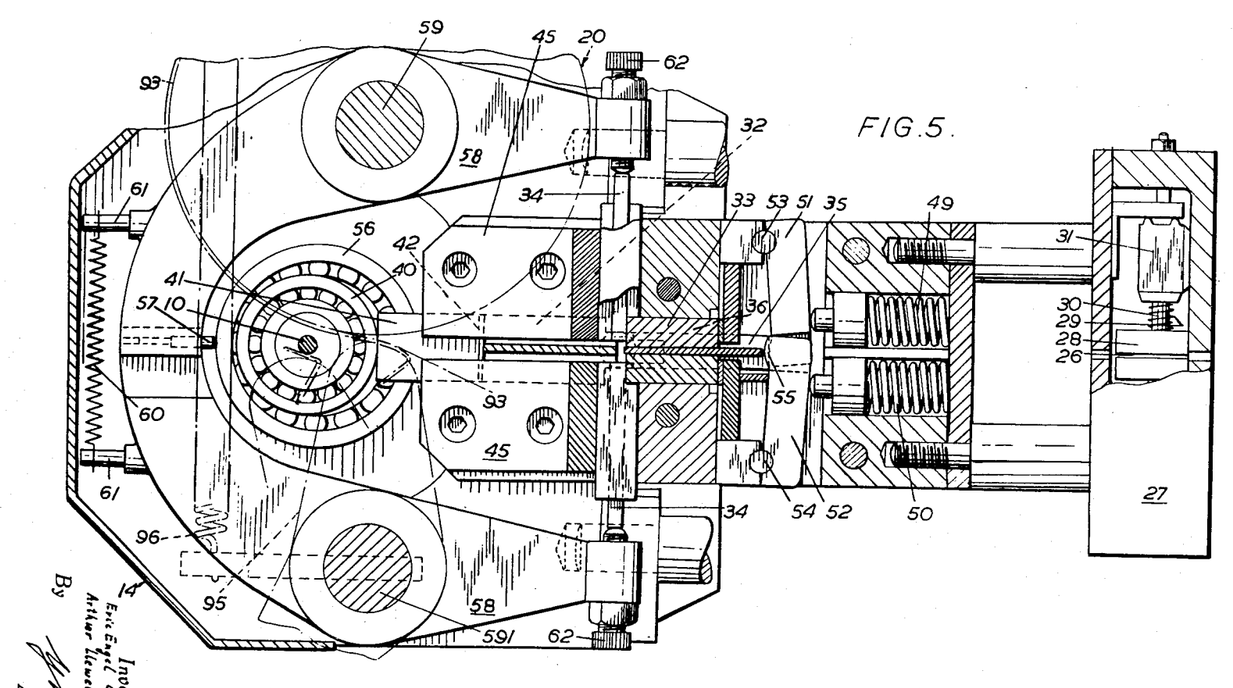
Fig. 5 is a section, on a still larger scale, along the line V—V of Fig. 4.
Figure 6:
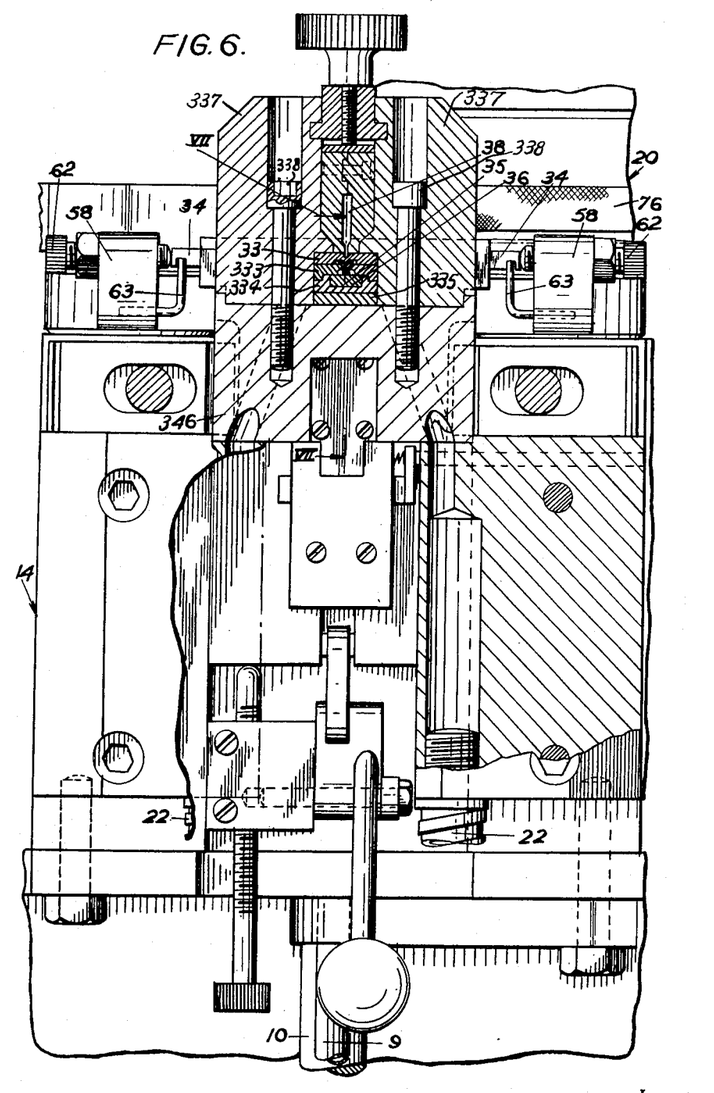
Fig. 6 is a similar section along the line VI—VI of Fig. 4.
Figure 7:
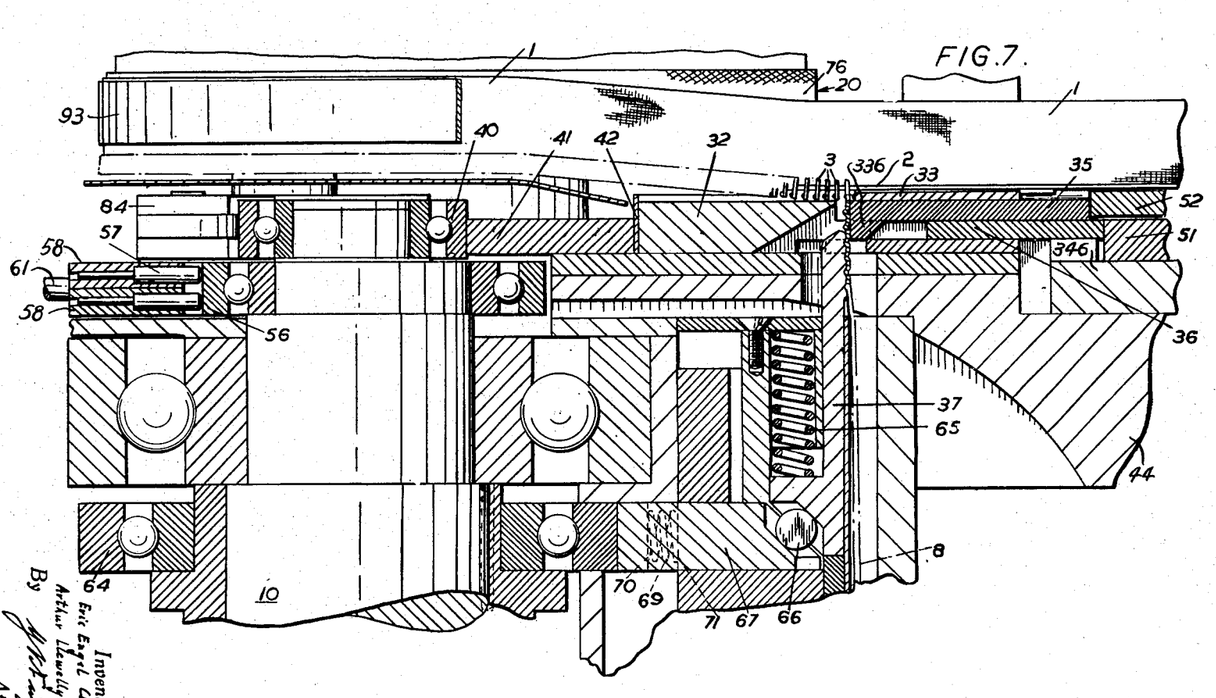
Fig. 7 is a section, on a still larger scale, along the line VII—VII of Fig. 6.

The feed finger 37 is reciprocated in a direction substantially parallel to the driving shaft 10 (in the drawings vertically) by means of a third ball bearing eccentric 64 (see Figs. 4 and 7). The feed finger 37 slides in a guide and is urged downwards by a spring 65. The lower end of said finger is, over a ball bearing 66, in operative connection with an actuating member 67 bearing against the third eccentric 64 under the action of an auxiliary spring 69 suitably bearing at 70 against the actuating member 67 and at 71 against a stationary member of the machine. From Fig. 7 it will readily be recognized that on rotation of the third eccentric 64 the actuating member reciprocates horizontally and causes the feed finger 37 to reciprocate vertically. It may be mentioned that the upper end of the feed finger 37 passes through a slot 68 in the punch 32, which slot can best be seen in Fig. 13, showing the punch 32 when viewed from underneath.

The tape drum 20 (see particularly Figs. 4, 7, 16 and 17) for drawing the tape 1 through the machine in a step-by-step manner comprises an outer shell 72 and an inner shell 80, the outer shell 72 having a top 79 with a central hole for passing the stationary non-rotating auxiliary shaft 59 therethrough. (As will be seen from Fig. 5, the auxiliary shaft 59 of the tape drum also forms the pivot for the lever arm 58 at the rear of the machine which operates one of the hammers 34.) The said auxiliary shaft 59 is arranged substantially parallel to the main driving shaft 10 (in the drawing vertically). A lid 77 is fixed to the auxiliary shaft 59 by means of a nut 73 and a spring 74, and presses frictionally against a stuffing or lining 75 held in a recess of the top 79 of the outer shell 72, the frictional pressure being adjustable by adjusting the tension of the spring 74 by means of the nut 73. The exterior surface of the annular wall depending from the top 79 of the outer shell 72 near its free end is knurled, serrated or otherwise roughened at 76 in order to increase friction between the said surface when contacting the tape 1 and is moreover provided with a recess 78 for accommodating zip fastener interlocking members on the tape. Although the annular side wall of the outer shell 72 may be fixed to the top 79 thereof in any suitable manner, it is preferably integral with the top 79 as shown, the top 79, the side wall, and a wall 90 depending from the top 79 being machined out of a single block of material.

Figure 17:
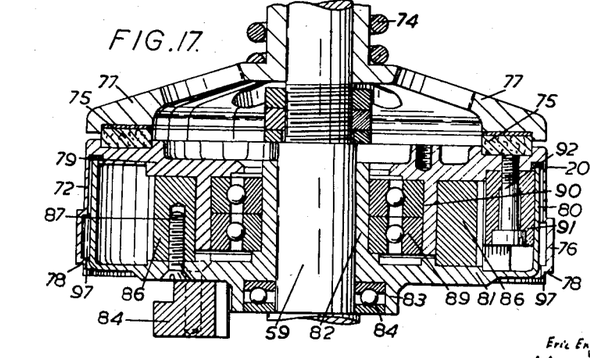
Fig. 17 is a section along the line XVII—XVII of Fig. 16.

The inner shell 80 comprises three parts, namely a bottom 81, an annular side wall, and a bushing 82, the side wall and the bushing extending upwards from the bottom 81, the arrangement being such that the bushing 82 surrounds part of the auxiliary shaft 59, while the side wall of the inner shell 80 is coaxially surrounded by and lies adjacent to the side wall of the outer shell 72. The bottom 81 has a short annular extension 83 directed downwards beyond the bottom 81 of the inner shell 80 so as to form, with the stationary shaft 59, a recess housing a ball bearing 84, one of the races of the said ball bearing 84 being keyed to the auxiliary shaft 59 and the other to the bottom 81 of the inner shell 80, whereby the inner shell 80 is oscillatably supported by said auxiliary shaft 59. The various parts of the inner shell 80 may be fixed to one another in any convenient manner but are preferably integral with one another as shown, the bushing 82 and the extension 83 merging into the bottom 81 and the bottom 81 merging into the side wall of the inner shell 80, the said parts being preferably machined out of a single piece of material.

It will easily be seen from Fig. 17 that the outer and inner shells 72 and 80 form an annular casing defined by the top 79 of the outer shell 72, the bottom 81 of the inner shell 80, its bushing 82, and the side wall of the inner shell. To the outer surface of the bottom 81 of the inner shell 80, an arm 84 is attached which carries a roller 85, co-operating with the eccentric 40 (see also Fig. 5). The roller 85 is held in engagement with the eccentric 40 by means of a spring 88. When, in operation, the eccentric 40 rotates, the arm 84 oscillates and imparts a rocking movement around the auxiliary shaft 59 to the inner shell 80.

To the inner surface of the bottom 81 of the inner shell 80, a ratchet wheel 86 is attached by means of screws 87 so that the ratchet wheel 86 is rocked together with the bottom 81 of the inner shell 80. To the bushing 82 of the inner shell 80, the inner races of ball bearings 89 are fixed, the outer races of the ball bearings 89 being fixed relatively to the top 79 and the wall 90 depending therefrom whereby the outer shell 72 is supported by the said ball bearings 89 so as to be able to rotate around the auxiliary shaft 59. A pawl 91 is attached by means of a screw 92 to the top 79 of the outer shell 72. It will easily be understood from Fig. 16 that when in operation the inner shell 80 and the ratchet wheel 86 are rocked in the direction of the double arrow Y, the outer shell will be rotated, in a step-by-step manner, in the direction of the arrow Z, back-movement of the outer shell 72 being prevented by the friction between the lining 75 on the top 79 of the outer shell 72 and the stationary lid 77.

Figure 18:
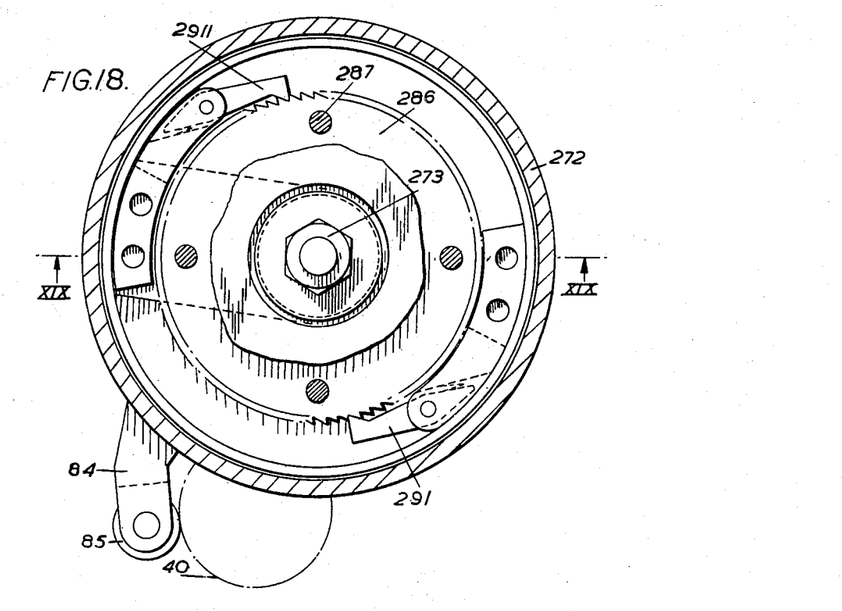
Fig. 18 is a view similar to that of Fig. 16 of a modified tape drum.
Figure 19:
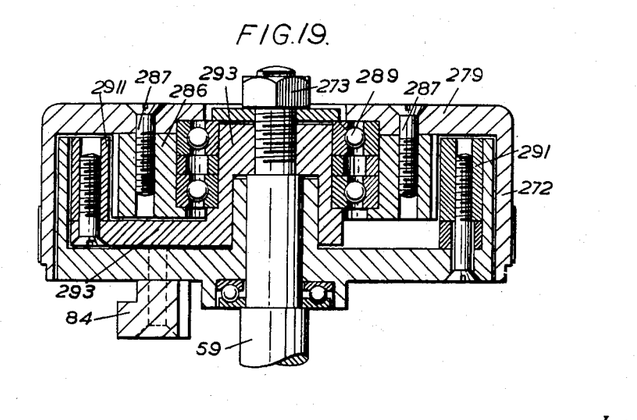
Fig. 19 is a section along the line XIX—XIX of Fig. 18.

Figs. 18 and 19 illustrate a modified tape drum in which a ratchet wheel 286 is fixed to the top 279 of an outer shell 272 by means of screws 287, the ratchet wheel 286 co-operating with a pawl 291 screwed to the inner shell, back-movement of the outer shell being prevented by a retaining pawl 2911 screwed to a stationary bracket 293 keyed to the auxiliary shaft 59 by means of a washer and a nut 273, the outer shell 272 being rotatably mounted on ball bearings 289 carried by the bracket 293.

With both embodiments, the annular space between the bushing and the side wall of the inner shell contains, in use, oil, which is fed to the space before the outer shell is attached, spilling of the oil and thereby soiling of the tape being, under ordinary working conditions, prevented by the outer shell after it has been attached.

It will be appreciated that each of the two tape drums is compact since, except for its arm 84, all essential parts for actuating the drum are enclosed by the two shells and are not arranged outside the drum where they would require additional space. The arrangement is easy to dismantle by unscrewing the nut 73 or 273, and disengaging the outer shell from the inner shell, whereupon the actuating mechanism is accessible, the arrangement being easily re-assembled by the reverse procedure.

For operating the drum, only the arm 84 on the bottom of the inner shell has to be oscillated. The actuating mechanism is immersed in oil, while the oil is prevented from soiling the tape under ordinary working conditions. Since the actuating mechanism is housed in the casing and immersed in oil, noise during operation of the drum is reduced. The ratchet wheel of each embodiment and the pawl or pawls may each be housed in an individual housing surrounding the greater portion of the ratchet wheel and the pawl or pawls respectively.

A resilient metal band 93 (see Figs. 4, 10 and 16), fixed at one end to a support 94 and at its other end to an arm 95 (see Fig. 5) is tensioned by a spring 96, the said metal band 93 serving to press the tape 1 against the knurled or otherwise roughened part 76 of the tape drum 20.

Figure 10:
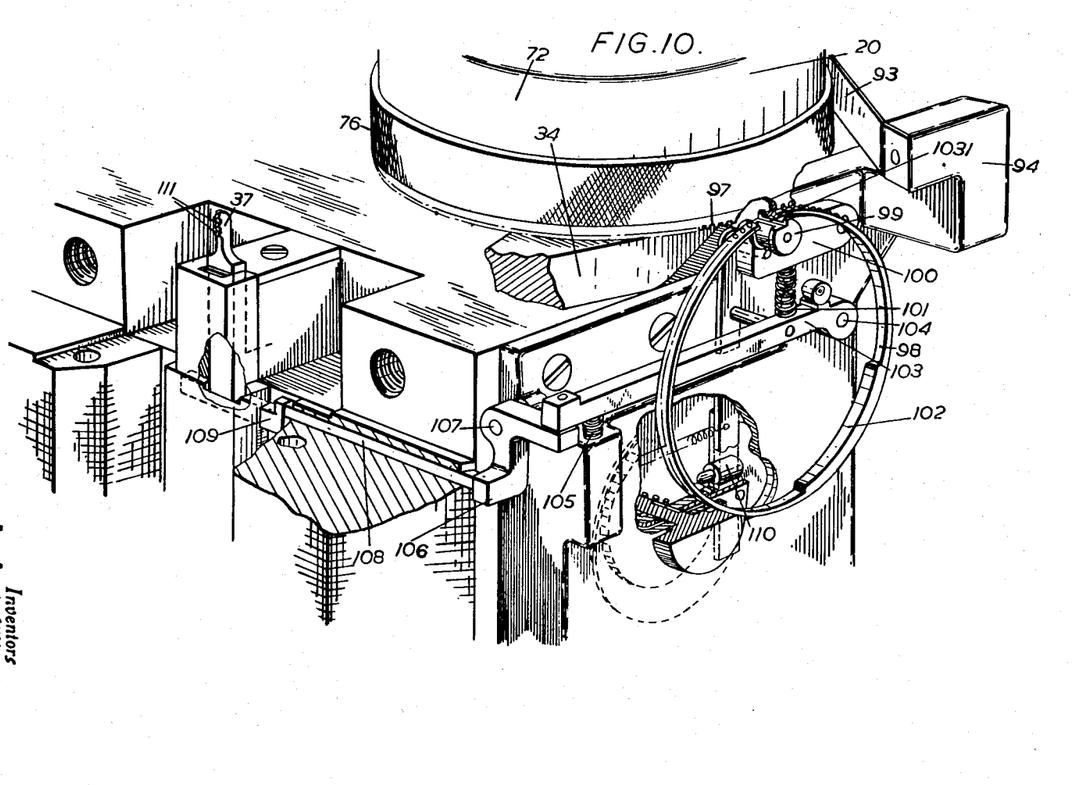
Fig. 10 is a different perspective view of some of the details of Figs. 8 and 9, additional details being visible.

As can best be seen from Figs. 10 and 17, the outer shell 72 of the tape drum 20 is provided with teeth 97 meshing with a toothed wheel 98 depending from a supporting roller 99 mounted on a lever 100 pressed upwards by a spring 101. The toothed wheel 98 has a ridge 102. When in operation the toothed wheel 98 rotates and its ridge passes between the supporting roller 99 and a stationary bridge 1031, the said supporting roller 99 is forced downwards moving a second lever 103 pivoted at 104 downwards against the action of a spring 105, whereby a cranked lever 106 pivoted at 107 is operated to push a rod 108 inwards so that its end 109 lies under the end of the feed finger 37, which at the moment of movement of the rod 108 is raised, whereby the feed finger 37 is prevented from moving downwards while the ridge 102 passes over the supporting roller 99. Thereby during such periods, the feed of interlocking members 3 to the tape 1 is temporarily interrupted while the feed of the tape continues, whereby the said members are arranged on the tape in groups as is known per se. On further rotation of the toothed wheel 98, its ridge 102 contacts and operates a feeler 110 actuating a counter for counting the groups of interlocking members on the tape. When a predetermined number of such groups have been manufactured by the machine, the counter may, in any conventional manner, stop the motor 11 and thus the machine, and/or it may give an acoustic or optical signal.

The machine operates as follows:

A tape 1 is drawn through the machine in a step-by-step manner by the tape drum 20 as just described. Since the tape drum 20 as well as the punch 32, hammers 34 and the feed finger 37 for feeding the metal strip 8 are driven by three eccentrics keyed to the same driving shaft 10, the proper timing of the various operations to be performed by the machine is ensured in a simple manner.

Figure 8:
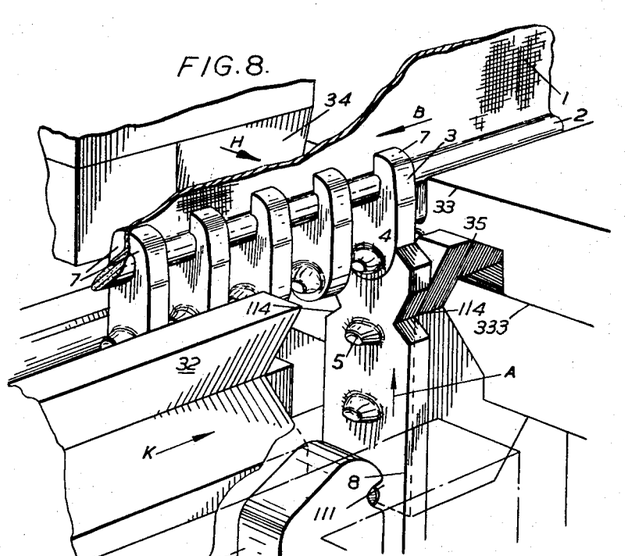
Fig. 8 is a perspective view of certain details of Fig. 7.
Figure 9:
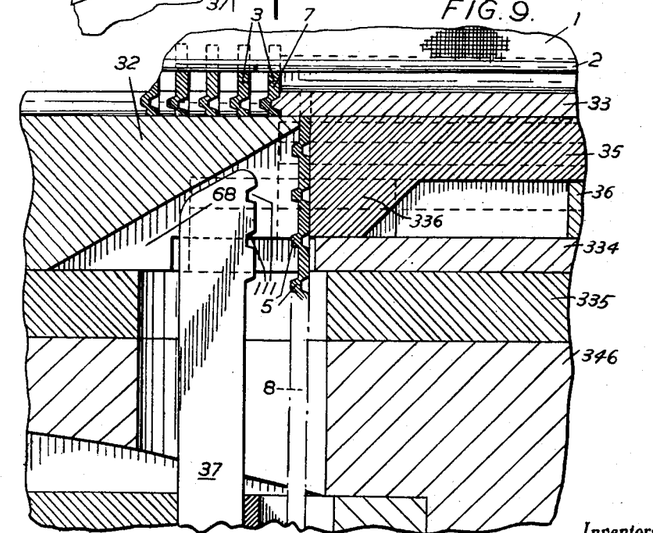
Fig. 9 is a sectional view of the details shown in Fig. 8 in a different working position.

At a certain instance, the tape 1 moves past the working position illustrated in Fig. 8 in the direction indicated by the arrow B, carrying with it the uppermost member 3 previously clamped to the tape 1 and severed from the strip 8 to enable the strip 8 to move upwards in the direction of the arrow A under the action of the feed finger 37. The feed finger 37 is provided at its free end with recesses 111 (see also Fig. 10) engaging the projections 5 preformed on the strip 8 to effect the feed of said strip. In the position shown in Fig. 8 the ejector 35 presses the strip 8 against the feed finger 37 to ensure engagement between the recesses 111 of the feed finger 37 and the projections 5 of the strip 8. As soon as the uppermost member 3 attached to the tape 1 has cleared the space it occupies in Fig. 8, the feed finger 37 is moved upwards by the third eccentric 64 in the manner hereinbefore explained so that the leading end of the strip 8 now occupies the place previously taken by the uppermost member 3 illustrated. As previously explained the feed finger slides through a slot 68 (see Figs. 9 and 13) of the punch 32. The punch 32 is provided at its front with a fork 115 (see Fig. 13) embracing the strip 8. The punch presser 36 is provided at its leading end with a fork 112 (see Fig. 11) permanently contacting shoulders 113 (see Figs. 11 and 13) of the punch 32 at each side of the fork 112, whereby to maintain operative contact between the rear of the punch 32, the padding 42 (see Fig. 5), the distance piece 41 and the eccentric 40. The leading end of the punch 32 moving in the direction of the arrow K of Fig. 8, reaches the strip 8 as soon as it has come to rest, and presses it, on further movement of the punch, against the die 33 and away from the feed finger 37 so that the recesses 111 of the feed finger 37 clear the projections 5 of the strip 8, this position being illustrated in Fig. 9. The feed finger 37 now moves downwards while clear of the strip 8 in the manner previously described. Simultaneously, the punch continues to move further to the right of Fig. 9, thereby in co-operation with the die 33 severing another member from the strip 8 and also cutting off the two waste pieces 39 (see Fig. 15) to form a next serration corresponding to the serrations 114 (see Fig. 8) in each edge of the strip 8. The punch 32 while moving towards the die 33 presses the punch presser 36 in the same direction against the action of the spring 50 (see Fig. 5), while the strip 8 during its movement towards the die presses the ejector 35 in the same direction against the action of the spring 49.

The hammers 34 move from both sides towards the strip 8, one in the direction of the arrow H in Fig. 8 and the other in the opposite direction. Shortly before, or during, or shortly after the severing operation of the punch 32, the hammers 34 contact the spread legs of the now foremost interlocking member 3 straddling the beaded edge 2 of the tape 1 and on further movement of the hammers 34 clamp the legs 7 of the said member 3 around the beaded edge 2 of the tape (see also Figs. 14 and 15).

The subsequent receding of the punch 32 from the die 33 is effected by the punch presser 36 in dependence on the rotation of the eccentric 40. When the punch 32 recedes and at the beginning of the next step-by-step movement of the tape 1 in the direction of the arrow B, the ejector 35 presses the severed member 3 and the strip 8 away from the die 33, the strip 8 again bearing against the feed finger 37, the hammers recede from the strip 8 whereby the now uppermost member 3 can follow the movement of the tape 1. During such movement, the arrangement assumes, again, the position shown in Fig. 8 ready for the next cycle of operations, the tape 1 continuing to move in the direction of the arrow B.

The machine of the invention has many advantages over known machines. Owing to the fact that the punch 32 reciprocates in a direction substantially perpendicular to the driving shaft 10, the eccentric 40 mounted on the driving shaft 10 may operate either directly or, as shown, over the distance piece 41 and a padding 42 on one end of the punch 32, thereby avoiding the provision of an additional gearing, such as a lever arrangement or ram, hitherto generally interposed between an eccentric and the punch. Moreover since the punch 32 does not reciprocate in the direction parallel to the driving shaft 10, no additional space need be reserved for movement in such a direction. Therefore, the tape drum 20 rotating around an axis parallel to the driving shaft 10 may be arranged closer to the punch 32 than was hitherto possible. For example, if the driving shaft is vertically arranged as shown, the punch 32 reciprocates horizontally and no space for movement of the punch 32 need be reserved above and below the punch 32. The tape drum 20 rotating around a vertical axis, and more particularly the lower, horizontal face of the tape drum, may be arranged close to the punch and may even partly overlap the distance piece 41 as shown. Thereby, not only space is saved and a compact machine provided, but the arrangement of the tape drum 20 close to the punch 32 and, thus, close to the attaching means or hammers 34 influences advantageously the quality of the zip fasteners manufactured. For a proper working of a zip fastener, it is necessary that the spacing between the interlocking members 3 on the tape 1 is uniform within very narrow limits. To achieve this, the tape drum 20 pulls the tape with a uniform force past the place where the members 3 are severed from the strip 8 of blank material and are attached to the tape 1. It will easily be seen that with a uniform pull on the tape the spacing of the members 3 is only uniform if the qualities of the tape 1, in particular its resiliency and flexibility, are uniform throughout the entire length of the tape. In practice, however, slight variations of the qualities of the tape 1 are unavoidable and the influence of such variations on the spacing of the members 3 will be the smaller the shorter the length of the tape is between the place where the members 3 are severed and attached to the tape 1 and the place where the uniform pull is exerted on the tape 1. Therefore, the nearer to the punch 32 and the attaching means or hammers 34 the tape drum 20 is located, the smaller are the limits within which the spacing of the members 3 varies and the better is the quality of the fasteners manufactured under otherwise equal conditions.

Besides the tape drum 20, other parts of the machine, such as the feed finger 37 for feeding the strip 8, the ejector 35 for ejecting the severed members 3 from the die 33 co-operating with the punch 32, may be arranged close to the punch 32.

The driving shaft 10 is driven by an electric motor 11, the rotatable spindle 115 of which is coaxial with the shaft 10. In the embodiment described, the machine is mounted directly on to a frame 116 of the electric motor 11 and supported thereby.

Again, the feed finger 37 during its return stroke downwards is out of engagement with the strip 8 and its preformed projections 5 whereby scraping the strip 8 on the said return stroke is prevented. This feature is particularly advantageous, since in the embodiment illustrated, the feed finger 37, during each working stroke, engages a projection 5 of the strip 8. By causing the said feed finger 37 to be out of engagement with projections 5 on the strip 8 during each return stroke of said finger, it is avoided that the feed finger 37 scrapes and, thereby, damages the sensitive projections 5 and causes dust, due to scraping, to accumulate.

The punch 32 is not fixed to the means for reciprocating it as was hitherto customary, and may, thus, be easily removed from the machine for exchange or repair by unscrewing the two parts 45 (see Fig. 11) of the guide member from the support, or the punch may be removed by simply sliding it out of its guide channel. Since the punch 32 is guided along substantially its entire length it can, as shown, be arranged so as to reciprocate in a substantially horizontal direction, whereas punches as hitherto used in this art are usually reciprocated in a substantially vertical direction. Since the punch 32 may be kept small its weight is small and the punch 32 is thereby well suited for punching at high speed. The two parts 45 (see Figs. 5 and 11) of the guide member are preferably not thicker than the punch and not longer than the punch and part of the distance piece 41. Thereby, a compact and comparatively small punching unit is obtained which may, by unscrewing a few screws, be bodily removed from the machine. Although the reciprocating means at the rear of the punch 32 may be replaced by a simple cam, the provision of the ball bearing eccentric 40 is preferred since it has the advantage of considerably reducing friction. The timing of the movements of the tape drum 20 and the punch 32 is particularly exact since both are operated by the same eccentric 40.

As will best be recognised from Figs. 11 and 13, the front of the punch 32 is suitably recessed so as to accommodate the projections 5 of the strip 8 and to avoid damaging of the preformed projections 5 during the punching operation.

The tape drum 20 is compact, is simple to assemble and to dismantle, is easily operated, and is easily kept lubricated without the danger of soiling the tape 1 under ordinary working conditions.

While a preferred embodiment of the invention has been described and illustrated, it should be clearly understood that the description and the drawings are given by way of example only. Many modifications, omissions and additions may be made by those skilled in the art without departing from the spirit of the present invention.

We claim:

1. In a machine for use in the manufacture of zip fasteners, a tape drum for feeding a tape in a step-by-step manner through the machine, means for feeding a strip of material from which zip fastener interlocking members are to be formed in a step-by-step manner through the machine, a reciprocatable punch for punching interlocking members from the strip of material, means for clamping the interlocking members on to the tape, a stationary shaft, a single driving shaft substantially parallel to said stationary shaft, a plurality of eccentrics fixed to said driving shaft for operating said tape drum, said strip feeding means, said punch and said clamping means in timed relationship to one another, the said punch being arranged to reciprocate in a direction substantially perpendicular to the said driving shaft, and at least a part of said tape drum being arranged for intermittent rotation around said stationary shaft, a die co-operating with said punch, an ejector for urging the strip of material away from said die and against said strip feeding means, a punch presser for urging the punch away from said die and towards the eccentric for operating the punch, a fork on said punch for circumventing the strip material and contacting the punch presser, the said punch having a slot forming a passage for said strip feeding means, and means for reciprocating said strip feeding means in a direction substantially parallel to said driving shaft, the reciprocations of said punch and said strip feeding means being so timed that when in use the strip is pressed against the die by the punch and clears the strip feeding means, the said strip feeding means performs its return stroke and when the punch recedes from the die, the said strip feeding means performs its feed stroke, the ejector pressing the strip into contact with said strip feeding means.

2. In and for a machine for use in the manufacture of zip fasteners, a punching tool comprising a unitary punch, two lateral shoulders extending in the longitudinal direction of said punch and provided on said punch one at each side thereof, a main support, two members releasably attached to said main support, a flange on each member, said flanges forming, with said main support, two guide channels, each guide channel being complementary in shape to one of said lateral shoulders, the said punch being mounted slidably in its longitudinal direction between the said two members with said shoulders engaging the said guide channels, distance means loosely contacting the rear of the punch, a driving shaft, a ball bearing eccentrically mounted on said driving shaft and arranged for loosely acting on the said distance means whereby to cause the punch to move in one sense, an auxiliary support mounted on said main support, a pair of mounting blocks releasably attached to the said auxiliary support, a flange on each mounting block and, held between the said auxiliary support and the flanges of the said mounting blocks, a support plate, a punch presser slide, a punch presser, an ejector, an auxiliary die, and a main die, the punch presser engaging the front of the punch and the punch presser and the ejector being longitudinally slidable between the punch presser slide and the auxiliary die, spring means mounted on said auxiliary support for maintaining the punch presser in contact with the said punch and for urging the punch in a sense opposite to the said one sense, and further spring means mounted on said auxiliary support for urging the ejector towards the said punch.

References Cited in the file of this patent

UNITED STATES PATENTS

| | | |
|---|---|---|
| 1,996,204 | Ingram | Apr. 2, 1935 |
| 2,006,040 | Crane | June 25, 1935 |
| 2,179,517 | Pelosi | Nov. 14, 1939 |
| 2,241,893 | Tuttle | May 13, 1941 |
| 2,287,507 | Antonietta | June 23, 1942 |
| 2,301,064 | Meitner | Nov. 3, 1942 |
| 2,302,075 | Ulrich | Nov. 17, 1942 |
| 2,302,084 | Wintritz | Nov. 17, 1942 |
| 2,347,221 | Simmonds et al. | Apr. 25, 1944 |
| 2,357,873 | Bower | Sept. 12, 1944 |
| 2,370,187 | Pechy | Feb. 27, 1945 |
| 2,385,836 | Norkin et al. | Oct. 2, 1945 |
| 2,396,933 | Voity | Mar. 18, 1946 |
| 2,437,793 | Silberman | Mar. 16, 1948 |
| 2,473,623 | Voity | June 21, 1949 |
| 2,478,880 | Voity | Aug. 9, 1949 |

FOREIGN PATENTS

| | | |
|---|---|---|
| 155,785 | Austria | Mar. 25, 1939 |